Figure 1:
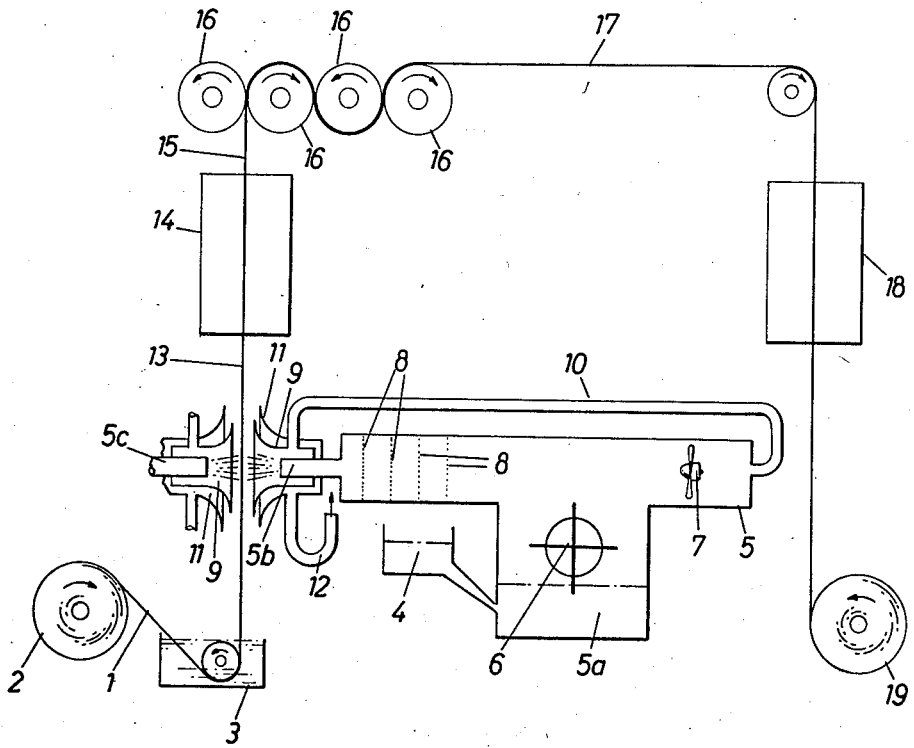

March 29, 1960     G. E. WATTS ET AL     2,930,104
PRODUCTION OF POWER TRANSMISSION AND CONVEYOR BELTING Filed July 17, 1957     2 Sheets-Sheet 1

INVENTORS
GILBERT ERNEST WATTS
STUART MOVERLEY

United States Patent Office 2,930,104
Patented Mar. 29, 1960

2,930,104

PRODUCTION OF POWER TRANSMISSION AND CONVEYOR BELTING

Gilbert Ernest Watts, Garden Village, Hull, and Stuart Moverley, Hull, England, assignors to J. H. Fenner & Co. Limited, Hull, England, a British company Application July 17, 1957, Serial No. 672,412

Claims priority, application Great Britain July 24, 1956

15 Claims. (Cl. 28—74)

The present invention relates to improvements in and methods of producing power transmission and conveyor belting of the type in which a multiple ply textile fabric is impregnated and/or coated, for example, with natural or synthetic rubber or with a composition containing a compound of the class known as "plastics," such as a polyvinyl compound, and particularly polyvinyl chloride. The invention is particularly concerned with belting in which the multiple ply textile fabric is "solid woven," that is to say the various plies of the fabric are held together by binding threads, with the whole fabric produced in one weaving operation, i.e. it is not a series of plies woven separately and then stitched or otherwise joined together subsequent to weaving. The term "solid woven" in this specification refers to the completion of the fabric and does not hold reference to ply density.

United States Patent application No. 482,632, now Patent No. 2,800,701 describes a method of producing improved power transmission and conveyor belting embodying a multiple ply solid woven textile fabric core, comprising the steps of weaving a multiple ply textile fabric so loosely as to be wholly unsuited for belting duties per se, subjecting said fabric to heat treatment to ensure substantially complete dryness thereof, cooling said fabric, subjecting said dried and cooled woven fabric to impregnation at atmospheric pressure with a liquid suspension or dispersion of an ungelled polyvinyl compound in a plasticiser, and thereafter imparting solidity to said impregnated woven fabric by subjecting it to heat treatment in order to gell the polyvinyl compound. The impregnation may be effected by dipping or spreading and the impregnated fabric may be provided with an additional sheathing coat of the polyvinyl compound.

The surface resistivity of polyvinyl chloride compositions varies according to type and composition, but in conventional commercially produced conveyor beltings it is in excess of $10^{10}$ ohms (see Technical Note X2, "The Isleworth Test for Polyvinyl Chloride Conveyor Belting," National Coal Board of Great Britain, March 1956 for test conditions). The term "polyvinyl chloride compositions" as used herein includes polyvinyl chloride powder intimately ground with a plasticiser such as trixylenyl phosphate.

In service these high resistivity beltings can build up large surface charges and give rise to sparking. Despite these beltings being flame-resistant, this sparking can be a dangerous condition in circumstances where a fire hazard exists, such as in coal mining, or in the vicinity of inflammable vapours, dusts or gases. For safe operation a value of $3 \times 10^8$ ohms has been stipulated (by the National Coal Board of Great Britain) as the maximum permissible belt surface resistivity.

The surface resistivity of polyvinyl chloride can be reduced by the incorporation of a conductive grade of carbon black in the mix. Up to 15 parts per 100 parts of polyvinyl chloride powder appear to have little effect upon the resistivity, but at an addition of 20 parts of carbon black the surface resistivity is lowered fairly sharply to a value of about $10^6$ ohms. In the case of polyvinyl chloride compositions used in their solid form, i.e. applied as a sheet to the belting and gelled to this by heat and pressure, the carbon black may be added to the polyvinyl chloride by normal methods such as mixing on an open roll mill or in an internal mixer such as a Banbury machine. The addition of carbon black makes the mix less easy to manipulate and to counteract this tendency an additional quantity of plasticiser is required. Such addition of carbon black, and extra plasticiser if this is added, greatly reduces the strength and wearing properties of the plastic sheet. The following figures indicate the effect of carbon black addition on the strength and elongation of the plastic mix; the addition makes the mix harder and less easy to manipulate.

|  | Mix A | Mix B |
|---|---|---|
| Polyvinyl chloride (pts. by wt.) | 100 | 100 |
| Plasticiser (Trixylenyl Phosphate, pts. by wt.) | 45 | 45 |
| Stabilizer (White Lead, pts. by wt.) | 1 | 1 |
| Vulcan (Registered Trade Mark) XXX Carbon Black (pts. by wt.) |  | 20 |
| Tensile Strength per sq. inch, lbs. | 3,200 | 2,600 |
| Percent Elongation at Break | 260 | 200 |

Where carbon black additions are made to pastes of polyvinyl chloride powder ground in plasticiser, the tendency is for the carbon black to absorb the plasticiser and change the fluid paste to a crumbly solid. Such crumbly solids are quite unsuited to paste technique of usage, but if compressed to a solid sheet (as occurs during gellation under pressure, due to the effects of heat and pressure) and tested for breaking strength and elongation it is found again that the physical properties have been lowered. Again an addition of about 20 parts of carbon black per 100 parts of polyvinyl chloride powder is necessary to make certain of a resistivity drop below $3 \times 10^8$ ohms. Adding further plasticiser to reform a paste results in a buttery mass at about 170 parts of plasticiser per 100 parts of polyvinyl chloride powder and 20 parts of carbon black. Further plasticiser addition up to even 200 parts has little effect upon the general paste properties. This large plasticiser addition produces a marked deterioration of physical properties as the following results show.

|  | Mix C | Mix D | Mix E |
|---|---|---|---|
| Polyvinyl chloride (pts. by wt.) | 100 | 100 | 100 |
| Plasticiser (trixylenyl Phosphate pts. by wt.) | 72 | 80 | 200 |
| Vulcan (Registered Trade Mark) XXX Black (pts. by wt.) |  | 20 | 20 |
| Stabilizer (White Lead pts. by wt.) | 1.5 | 1.5 | 1.5 |
| Tensile Strength lbs./sq. inch | 2,575 | 1,250 | 635 |
| Percent Elongation at break | 350 | 225 | 350 |

An object of the invention is to reduce the surface resistivity of impregnated and/or coated belting without causing substantial deterioration of the physical properties of the belting.

According to the present invention, a coating of electrically conductive carbon is applied to an outer surface or surfaces of belting of the aforementioned type after impregnation and/or coating of the multiple ply textile fabric, said surface or surfaces being in a form capable of accepting and holding the carbon coating.

Thus the surface may be the surface of a paste with which the multiple ply textile fabric has been impregnated and/or coated e.g. by spreading or dipping or may be the surface of a liquid layer covering the impregnated or coated textile fabric. The carbon coating may be consolidated on said surface when the surface is consolidated by decreasing the liquids content of the paste or removing the liquid layer e.g. by heating.

In a preferred form of the invention, the belting is of the type in which a solid woven multiple ply textile fabric is impregnated and/or coated with a paste of a powdered compound of the "plastics" class ground in a plasticiser. Thus the method of our aforementioned application may be modified to include the additional step of applying the carbon in powder form to an outer surface or surfaces of the belting after the impregnation of the fabric with an ungelled polyvinyl compound in a plasticiser and before heat treatment of the impregnated woven fabric in order to gel the polyvinyl compound.

The carbon forms a surface layer which is gelled into the composition containing the polyvinyl compound during the subsequent heat treatment. If desired the heat treatment may be carried out with the belting under pressure in order to assist consolidation of the surface to which the carbon has been applied. Alternatively, the pressure may be applied immediately after the heat treatment.

The surface to which the carbon is applied may be the outer surface or surfaces of the belting after impregnation with the polyvinyl compound or may be the outer surface or surfaces of the sheathing coat of polyvinyl compound or both. It will be appreciated that if the outer surfaces of both the belting after impregnation and the sheathing coat of polyvinyl compound are to be treated, the carbon coating may be applied to the outer surface of the belting after impregnation, the sheathing coat of polyvinyl compound then applied, a second carbon coating applied to the outer surface of the sheathing coat and the resulting assembly subjected to heat treatment in order to gel the polyvinyl compound or compounds. Such treatment provides the belting with both an inner and an outer conductive surface or surfaces.

Application of the carbon may be effected by blowing the powder onto the surface, for example by means of a spray device, or by passing the belting through a chamber filled with a fog of carbon dust.

The amount of carbon powder applied should be sufficient to give a uniform covering but to be free from excess such as would be loosely held after gellation. Such excess can be brushed off, but the layer of powder intimate with the composition containing the polyvinyl compound is held firmly.

The invention includes power transmission or conveyor belting fabricated according to the method of the present invention. Moreover the multiple ply textile fabric may possess any of the weaves described in the aforementioned patent.

Polyvinyl chloride surfaces treated in accordance with the invention have a surface resistivity of approximately $10^6$ ohms or less and exhibit good wearing properties.

The invention will now be further described with reference to the accompanying drawings in which—

Figure 2:
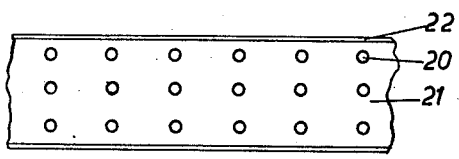
Figure 3:
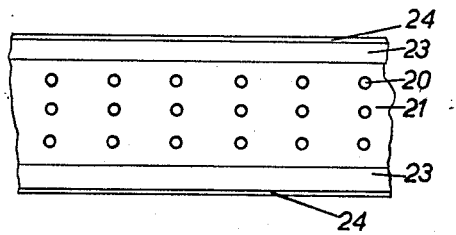
Figure 4:
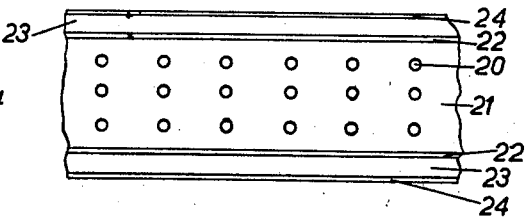

Fig. 1 illustrates diagrammatically a method of providing a consolidated coating of an electrically conductive carbon on the outer surfaces of power transmission and conveyor belting, and Each of Figs. 2, 3 and 4 is a fragmentary sectional elevation of belting made in accordance with the invention.

In Figs. 2, 3 and 4, like numbers refer to like parts and the drawings are not to scale.

In Fig. 1 solid woven multiple-ply textile fabric 1 is drawn from a roll 2 and passes through an impregnating bath 3 containing a dispersion consisting of approximately 45% by weight of polyvinyl chloride powder intimately ground with 55% by weight of tricresyl phosphate together with small amounts of a stabiliser and colouring matter.

Carbon black is supplied from a hopper 4 to the well 5a of a chamber 5. A beater 6 raises a cloud of carbon powder within the chamber 5 and a fan 7 blows the carbon powder to the spraying nozzle 5b of the chamber 5 via wire gauze screens 8 which serve to produce a uniform distribution of the carbon powder.

After leaving the impregnating bath 3 the impregnated fabric passes between the spraying nozzle 5b and a similar spraying nozzle 5c, which may be supplied with carbon powder either from chamber 5 or from a separate chamber (not shown) similar to chamber 5. Carbon powder from spraying nozzles 5b and 5c is sprayed onto opposite sides of the impregnated fabric and adheres to the ungelled dispersion with which the fabric has been impregnated. Surplus powder is substantially confined within a shield 9 surrounding nozzle 5b and is returned to chamber 5 via a tube 10 connecting the interior of the shield to the suction side of fan 7. Shield 9 is surrounded by a second shield 11 and any powder escaping from the confines of shield 9 is drawn within shield 11 and removed by suction through a tube 12 communicating with the interior of shield 11. Spraying nozzle 5c is similarly associated with shields 9 and 11.

After receiving a surface coating of carbon powder, the impregnated and coated fabric 13 passes through a gelling chamber 14 maintained at a temperature of 250–280° C. to gel the polyvinyl chloride dispersion and consolidate the carbon coating upon the surface of the impregnated fabric. From the chamber 14 the resultant belting 15 passes between the rollers 16 which exert pressure upon the belting surface to produce further consolidation of the carbon coating upon the belting surface. The resultant belting 17 passes through a cooling chamber 18 to take up roll 19.

In Fig. 2, a three ply textile fabric represented by weft threads 20 is impregnated with polyvinyl chloride 21 and the resulting belting is coated with a layer of electrically conductive carbon 22. The warp threads binding the weft threads 22 have been omitted for clarity.

In Fig. 3, the belting resulting from impregnating the fabric represented by weft threads 20 with polyvinyl chloride 21 is provided with sheathing coats of polyvinyl chloride 23 and each sheathing coat 23 is provided with a coating of electrically conductive carbon 24.

In Fig. 4, the belting resulting from impregnating the fabric represented by weft threads 20 with polyvinyl chloride 21 is coated with a layer of electrically conductive carbon 22. The sheathing coat of polyvinyl chloride 23 is applied on top of the carbon coating 22 and a further coating of electrically conductive carbon 24 is applied to the sheathing coat 23.

A typical figure for the surface resistivity of such a belting is $5 \times 10^4$ ohms and this comparatively low surface resistivity is achieved by the application of a quantity of carbon black which is insufficient to affect the weight of the belting substantially.

We claim:

1. A method of producing power transmission and conveyor belting having reduced surface resistivity and embodying a multiple ply solid woven textile fabric comprising the steps of weaving a multiple ply solid woven textile fabric so loosely as to be wholly unsuited for belting duties per se, subjecting said fabric to heat treatment to ensure sufficiently complete dryness thereof, cooling said fabric, subjecting said dry and cooled fabric to impregnation at atmospheric pressure with a liquid dispersion in a plasticiser of an ungelled polyvinyl compound capable of passing to solid phase without shrinkage when gelled by heat treatment, applying a layer of electrically conductive carbon in powder form to an outer surface of the belting, and thereafter subjecting the impregnated and carbon-coated woven fabric to heat treatment in order to gel the polyvinyl compound and consolidate the carbon coating.

2. In the manufacture of power transmission and conveyor belting by impregnating a multiple ply textile fabric with an ungelled polyvinyl compound capable of passing to solid phase without shrinkage when gelled by heat treatment, and thereafter heating the impregnated fabric to gel the polyvinyl compound, the step of blowing electrically conductive carbon in powder form onto the surface of the belting between the impregnation and the heating steps thereby reducing the surface resistivity of the belting.

3. In the manufacture of power transmission and conveyor belting, the steps of impregnating a multiple ply textile fabric with an ungelled polyvinyl compound capable of passing to solid phase without shrinkage when gelled by heat treatment, subjecting said impregnated fabric to heat treatment to gell the polyvinyl compound, coating the resultant belting with a sheathing coat of said ungelled polyvinyl compound, blowing electrically conductive carbon in powder form onto the outer surface of said sheathing coat, and heating said sheathing coat to gell the polyvinyl compound and consolidate the carbon coating on the outer surface of the sheathing coat.

4. Belting comprising an impregnated multiple ply solid woven textile fabric having a consolidated surface coating consisting solely of electrically conductive carbon.

5. Belting comprising a multiple ply solid woven textile fabric, the interstices of which are substantially completely filled with a polyvinyl compound which has been gelled by heat treatment, said belting having a consolidated surface coating consisting solely of electrically conductive carbon.

6. Belting comprising a multiple ply solid woven textile fabric, the interstices of which are substantially completely filled with a polyvinyl compound which has been gelled by heat treatment, said belting having a sheathing coat of said polyvinyl compound, and the outer surface of said sheathing coat carrying a consolidated coating consisting solely of electrically conductive carbon.

7. Belting comprising a multiple ply solid woven textile fabric, the interstices of which are substantially completely filled with a polyvinyl compound which has been gelled by heat treatment, said belting having a sheathing coat of said polyvinyl compound and two surface coatings each consisting solely of electrically conductive carbon, one on the outer surface of said sheathing coat and the other immediately within said sheathing coat.

8. In the manufacture of power transmission and conveyor belting by impregnating a multiple ply textile fabric with an uncured rubber and thereafter heating the impregnated fabric to cure the rubber, the step of applying a coating of electrically conductive carbon directly in powder form to an outer surface of the belting between the impregnation and heating steps, thereby reducing the surface resistivity of the belting.

9. In the manufacture of power transmission and conveyor belting by impregnating a multiple ply textile fabric with an ungelled polyvinyl compound capable of passing to solid phase without shrinkage when gelled by heat treatment, and thereafter heating the impregnated fabric to gell the polyvinyl compound, the step of applying a coating of electrically conductive carbon directly in powder form to the surface of the belting betwen the impregnation and heating steps, thereby reducing the surface resistivity of the belting.

10. In the manufacture of power transmission and conveyor belting by impregnating a multiple ply textile fabric with ungelled polyvinyl chloride, and thereafter heating the impregnated fabric to gell the polyvinyl chloride, the step of applying a coating of electrically conductive carbon directly in powder form to the surface of the belting between the impregnation and heating steps, thereby reducing the surface resistivity of the belting.

11. In the manufacture of power transmission and conveyor belting, the steps of impregnating a multiple ply textile fabric with a polyvinyl chloride paste, applying a coating of electrically conductive carbon directly in powder form to the surface of said impregnated fabric and thereafter consolidating said paste and consolidating said carbon coating on said surface by decreasing the liquid content of the paste.

12. In the manufacture of power transmission and conveyor belting, the steps of impregnating a multiple ply textile fabric with an ungelled polyvinyl compound capable of passing to solid phase without shrinkage when gelled by heat treatment, subjecting said impregnated fabric to heat treatment to gell the polyvinyl compound, coating the resultant belting with a sheathing coat of said ungelled polyvinyl compound, applying a coating of electrically conductive carbon directly in powder form to the outer surface of said sheathing coat, and subjecting said sheathing coat to heat treatment to gell the polyvinyl compound and consolidate the carbon coating on the outer surface of the sheathing coat.

13. In the manufacture of power transmission and conveyor belting, the steps of impregnating a multiple ply textile fabric with an ungelled polyvinyl compound capable of passing to solid phase without shrinkage when gelled by heat treatment, applying a coating of electrically conductive carbon directly in powder form to the surface of the impregnated fabric, subjecting the resultant carbon-coated impregnated fabric to heat treatment to gell the polyvinyl compound and consolidate the carbon coating, coating the resultant belting with a sheathing coat of said ungelled polyvinyl compound, applying a further coating of electrically conductive carbon directly in powder form to the outer surface of said sheathing coat, and subjecting said sheathing coat to heat treatment to gell the polyvinyl compound and consolidate the carbon coating on the outer surface of the sheathing coat.

14. In the manufacture of power transmission and conveyor belting the steps of impregnating a multiple ply textile fabric with an ungelled polyvinyl compound capable of passing to solid phase without shrinkage when gelled by heat treatment, applying a coating of electrically conductive carbon directly in powder form to the surface of the impregnated fabric, subjecting the resultant carbon-coated impregnated fabric to heat treatment to gell the polyvinyl compound and consolidate the carbon coating on said surface and further consolidating said carbon coating by applying pressure to said surface.

15. In the manufacture of power transmission and conveyor belting, the steps of impregnating a multiple ply textile fabric with an ungelled polyvinyl compound capable of passing to solid phase without shrinkage when gelled by heat treatment, subjecting said impregnated fabric to heat treatment to gell the polyvinyl compound, coating the resulting belting with a sheathing coat of said ungelled polyvinyl compound, applying a coating of electrically conductive carbon directly in powder form to the outer surface of said sheathing coat, subjecting said sheathing coat to heat treatment to gell the polyvinyl compound and consolidate the carbon coating on the outer surface of the sheathing coat and further consolidating said carbon coating by applying pressure to the outer surface of said sheathing coat.

References Cited in the file of this patent

UNITED STATES PATENTS

| | | |
|---|---|---|
| 963,014 | Smith | June 28, 1910 |
| 2,096,692 | Cilley | Oct. 19, 1937 |
| 2,318,441 | Walton et al. | May 4, 1943 |
| 2,443,782 | Barnard et al. | June 22, 1948 |
| 2,622,152 | Rosch | Dec. 16, 1952 |
| 2,688,576 | Ryan et al. | Sept. 7, 1954 |
| 2,781,159 | Copeman | Feb. 12, 1957 |
| 2,800,701 | Watts et al. | July 30, 1957 |